US009551602B2

(12) United States Patent
Sakano

(10) Patent No.: US 9,551,602 B2
(45) Date of Patent: Jan. 24, 2017

(54) ELECTROMAGNETIC FLOW METER AND MAGNETIC EXCITATION CONTROL METHOD

(71) Applicant: Azbil Corporation, Tokyo (JP)

(72) Inventor: Youhei Sakano, Tokyo (JP)

(73) Assignee: Azbil Corporation, Tokyo (JP)

(\*) Notice: Subject to any disclaimer, the term of this patent is extended or adjusted under 35 U.S.C. 154(b) by 0 days.

(21) Appl. No.: 15/013,569

(22) Filed: Feb. 2, 2016

(65) Prior Publication Data

US 2016/0223372 A1   Aug. 4, 2016

(30) Foreign Application Priority Data

Feb. 3, 2015   (JP) .................................. 2015-019101

(51) Int. Cl.
*G01F 1/58*   (2006.01)

(52) U.S. Cl.
CPC ..................... *G01F 1/588* (2013.01)

(58) Field of Classification Search
CPC ........................................................ G01F 1/58
USPC ............................ 73/861.12, 861.13, 861.17
See application file for complete search history.

(56) References Cited

U.S. PATENT DOCUMENTS

| | | | | |
|---|---|---|---|---|
| 3,894,430 A | * | 7/1975 | Rummel | G01F 1/60 73/861.17 |
| 4,601,209 A | * | 7/1986 | Amata | G01F 1/586 73/861.17 |
| 4,663,976 A | * | 5/1987 | Suzuki | G01F 1/60 361/154 |
| 4,969,363 A | * | 11/1990 | Mochizuki | G01F 1/002 324/439 |
| 5,844,143 A | * | 12/1998 | Tomita | G01F 1/60 73/861.12 |

FOREIGN PATENT DOCUMENTS

| | | |
|---|---|---|
| JP | H11-017110 A | 1/1999 |
| JP | 2000-241217 A | 9/2000 |
| JP | 2010-107441 A | 5/2010 |
| JP | 2015-019101 A | 1/2012 |

OTHER PUBLICATIONS

Japanese Application No. 2015-019101, filed Feb. 3, 2015.

\* cited by examiner

*Primary Examiner* — Jewel V Thompson
(74) *Attorney, Agent, or Firm* — Amster, Rothstein & Ebenstein, LLP

(57) ABSTRACT

To suppress the generation of bubbles of gas dissolved in a fluid, a flow evaluating portion compares a measured flow rate value with a preset reference flow rate value and determines whether a fluid is flowing through a measurement tube. When the flow evaluating portion determines that the fluid is not flowing through the measurement tube, a magnetic excitation controlling portion imposes a limitation so that a magnetic excitation current reduces to an electric current value less than a magnetic excitation current obtained in normal measurement. When the flow evaluating portion determines that the fluid is flowing through the measurement tube, the magnetic excitation controlling portion releases the limitation on the magnetic excitation current.

6 Claims, 7 Drawing Sheets

ELECTROMAGNETIC FLOW METER AND MAGNETIC EXCITATION CONTROL METHOD

CROSS-REFERENCE TO RELATED APPLICATION

The present application claims the benefit of and priority to Japanese Patent Application No. 2015-019101, filed on Feb. 3, 2015, the entire contents of which are incorporated by reference herein.

TECHNICAL FIELD

The present invention relates to a magnetic excitation control technique for an electromagnetic flow meter measuring the flow rate of a fluid filling a container.

BACKGROUND ART

In a fluid filling machine that fills a container such as a plastic bottle with a fluid such as drink, the fill amount of a fluid is sensed by an electromagnetic flow meter that measures the flow rate based on an electromotive force generated in the fluid to which a magnetic field has been applied (see cited documents 1 to 4, for example).

Some of such fluid filling machines have the function of filling different containers with different fluids. In such fluid filling machines, filling of a fluid is stopped once in preparation work for changing the type of a filling fluid or adjusting the filling operation.

FIG. 7 is an explanatory diagram illustrating changes in the state of an electromagnetic flow meter in preparation work, FIG. 7(a) illustrates a liquid exchange process, and FIG. 7(b) illustrates an adjustment process.

In the liquid exchange process in FIG. 7(a), the old fluid previously used is first drained and, after the old fluid is drained completely, a new fluid is preliminarily flowed. After a certain amount of the new liquid is preliminarily flowed, the process reaches the fill waiting state of new fluid. Accordingly, in such a liquid exchange process, the fluid state in the detector of the electromagnetic flow meter is the full-water state at the start of draining, the non-full-water state at the completion of draining, and the full-water state again when the new liquid is preliminarily flowed.

In addition, the adjustment process in FIG. 7(b) first starts a trial filling for filling the container with a fluid on a trial base in the fill waiting state, reaches fill completion through a filling state, checks the fill amount and the like, and returns to the fill waiting state. Accordingly, in such an adjustment process, the fluid state in the detector of the electromagnetic flow meter remains to be the full-water state from the fill waiting state to the fill waiting state which follows trial fill start and fill completion. The full-water state in the electromagnetic flow meter indicates a state in which the fluid to be measured makes contact with the electrodes provided on the inner wall of the flow path of the detector.

PRIOR ART DOCUMENTS

Patent Documents

[PTL 1] JP-A-2010-107441
[PTL 2] JP-A-2000-241217
[PTL 3] JP-A-11-17110
[PTL 4] JP-A-2012-17138

SUMMARY OF THE INVENTION

Problems to be Solved by the Invention

However, in the related art as described above, when the container is filled with a gas-dissolved fluid such as a fluid including carbon dioxide as the liquid type, if the fluid state in the detector of the electromagnetic flow meter is the full-water state and the fluid stays for a long time without flowing, the fluid is heated by the magnetic excitation coil of the detector and bubbles are likely to be generated. Accordingly, when such bubbles are attached to the electrodes on the inner wall of the detector, the bubbles function as an electric insulator and the electromotive force generated in the fluid cannot be detected, thereby interfering with flow rate measurement by the electromagnetic flow meter.

That is, in the electromagnetic flow meter, since the converter supplies a magnetic excitation current to the magnetic excitation coil of the detector when the flow rate of the fluid is measured, the magnetic excitation coil is likely to produce heat. The amount of heat generated by the magnetic excitation coil does not increase the temperature of the fluid because the fluid is flowing normally. However, when the fluid is not flowing, the fluid staying in the same position is heated and the temperature rises. Accordingly, when gas is dissolved in the fluid, as the temperature of the fluid rises, the saturated amount of gas dissolved in the fluid reduces and bubbles of gas are likely to be generated.

In addition, the electromagnetic flow meter detects an electromotive force generated in the fluid flowing through the magnetic field generated in the magnetic excitation coil by using a pair of electrodes disposed (in contact with the fluid flowing through the flow path) on the inner wall of the measurement tube so as to face the direction orthogonal to the direction of the magnetic field and calculates the flow rate based on the electromotive force. Accordingly, when the generated bubbles are attached to the electrode surfaces, the electrical contact area between the electrodes and the fluid becomes smaller because the bubbles are electrical insulators and the electromotive force cannot be detected correctly, thereby interfering with flow rate measurement by the electromagnetic flow meter.

The invention addresses the above problem with an object of providing a magnetic excitation control technique for an electromagnetic flow meter that prevents bubbles of gas dissolved in the fluid from being generated.

Means for Solving the Problems

To achieve the above object, according to the invention, there is provided an electromagnetic flow meter applying a magnetic field to a fluid flowing through a measurement tube by supplying a magnetic excitation current from a magnetic excitation circuit to a magnetic excitation coil, detecting an electromotive force generated in the fluid according to the magnetic field using a pair of electrodes disposed so as to face each other on an inner wall of the measurement tube, and calculating a measured flow rate value of the fluid based on the electromotive force, the electromagnetic flow meter including a flow evaluating portion comparing the measured flow rate value with a present reference flow rate value and determining whether the fluid is flowing through the measurement tube and a magnetic excitation controlling portion imposing a limitation so that the magnetic excitation current reduces to an electric current value less than the magnetic excitation current obtained in normal measurement when the flow evaluating portion determines that the fluid is not flowing and releasing the limitation on the magnetic excitation current when the flow evaluating portion determines that the fluid is flowing.

In an example of the structure of the electromagnetic flow meter according to the invention, the magnetic excitation controlling portion instructs the magnetic excitation circuit to switch the magnetic excitation current to a limited electric current value less than a normal electric current value used for normal flow rate measurement when imposing a limitation on the magnetic excitation current and instructs the magnetic excitation circuit to switch the magnetic excitation current to the normal electric current value when releasing the limitation on the magnetic excitation current.

According to the invention, there is provided an electromagnetic flow meter applying a magnetic field to a fluid flowing through a measurement tube by supplying a magnetic excitation current from a magnetic excitation circuit to a magnetic excitation coil, detecting an electromotive force generated in the fluid according to the magnetic field using a pair of electrodes disposed so as to face each other on an inner wall of the measurement tube, and calculating a measured flow rate value of the fluid based on the electromotive force, the electromagnetic flow meter including a comparator performing alternate current amplification of the electromotive force, comparing a direct current flow rate voltage obtained by sampling and holding with a preset reference flow rate voltage, and determining whether the fluid is flowing through the measurement tube, in which the magnetic excitation circuit imposes a limitation so that the magnetic excitation current reduces to an electric current value less than the magnetic excitation current obtained in normal measurement when the comparator determines that the fluid is not flowing and releases the limitation on the magnetic excitation current when the comparator determines that the fluid is flowing.

In an example of the structure of the electromagnetic flow meter according to the invention, the magnetic excitation circuit switches the magnetic excitation current to a limited electric current value less than a normal electric current value used for normal flow rate measurement when imposing a limitation on the magnetic excitation current and switches the magnetic excitation current to the normal electric current value when releasing the limitation on the magnetic excitation current.

According to the invention, there is provided a magnetic excitation control method used by an electromagnetic flow meter applying a magnetic field to a fluid flowing through a measurement tube by supplying a magnetic excitation current from a magnetic excitation circuit to a magnetic excitation coil, detecting an electromotive force generated in the fluid according to the magnetic field using a pair of electrodes disposed so as to face each other on an inner wall of the measurement tube, and calculating a measured flow rate value of the fluid based on the electromotive force, the magnetic excitation control method including a flow determination step of comparing the measured flow rate value with a present reference flow rate value and determining whether the fluid is flowing through the measurement tube and a magnetic excitation control step of imposing a limitation so that the magnetic excitation current reduces to an electric current value less than the magnetic excitation current obtained in normal measurement when the flow determination step determines that the fluid is not flowing and releasing the limitation on the magnetic excitation current when the flow determination step determines that the fluid is flowing.

In an example of the structure of the magnetic excitation control method according to the invention, the flow determination step performs alternate current amplification of the electromotive force, compares a direct current flow rate voltage obtained by sampling and holding with a preset reference flow rate voltage, and determines whether the fluid is flowing through the measurement tube.

Advantage of the Invention

According to the invention, since the magnetic excitation current is limited when the fluid is not flowing through the measurement tube, the amount of heat generated by the magnetic excitation coil is reduced and the generation of bubbles from the fluid is suppressed even when the fluid stays and bubbles are likely to be generated. Accordingly, in the filling of a gas-dissolved fluid such as a fluid (aerated water) including carbon dioxide or a fluid (oxygen water) including oxygen using a fluid filling machine that fills a container such as a plastic bottle with a fluid such as drink, even when the fluid stays in the measurement tube during preparation work such as a liquid exchange process or adjustment process, it is possible to prevent bubbles of gas generated in the fluid from interfering with flow rate measurement.

MODE FOR CARRYING OUT THE INVENTION

Next, embodiments of the invention will be described with reference to the drawings.

First Embodiment

Figure 1:
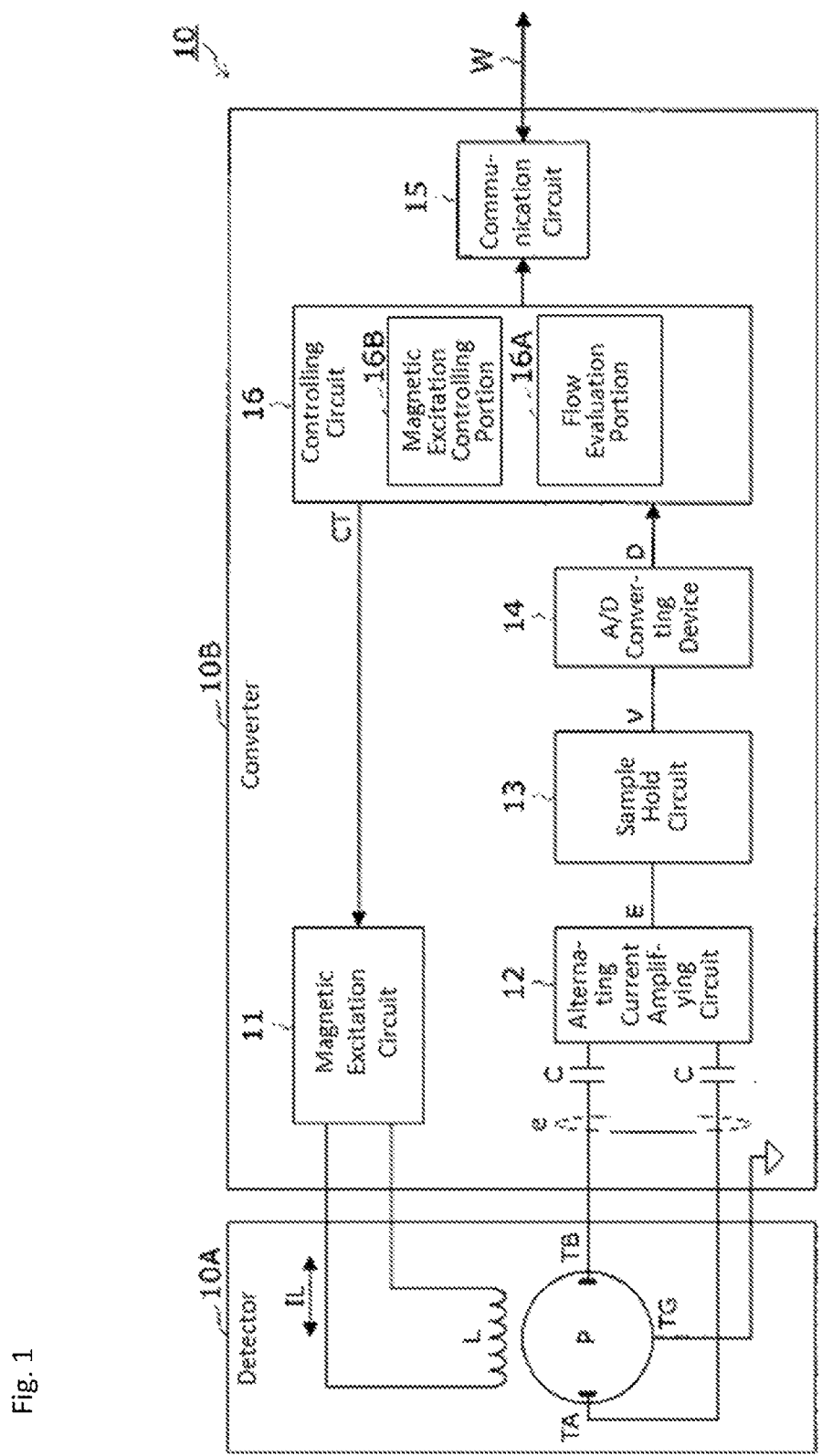
FIG. 1 is a block diagram illustrating the structure of an electromagnetic flow meter according to a first embodiment.

First, an electromagnetic flow meter 10 according to a first embodiment of the invention will be described with reference to FIG. 1. FIG. 1 is a block diagram illustrating the structure of an electromagnetic flow meter according to the first embodiment.

The electromagnetic flow meter 10 includes a detector 10A and a converter 10B as a whole and has the function of measuring the flow rate of a conductive fluid in various process systems. The electromagnetic flow meter 10 is used to measure the flow rate based on an electromotive force generated in a fluid to which a magnetic field is applied when the fill amount of fluid is sensed using, for example, a fluid filling machine that fills a container such as a plastic bottle with a fluid such as drink.

The detector 10A is provided with a measurement tube P, electrodes TA and TB, and a magnetic excitation coil L as main components.

As a whole, the measurement tube P is formed by a cylindrical body made of non-magnetic metal such as stainless steel and includes a flow path through which a fluid to be measured flows.

The magnetic excitation coil L is a pair of coils disposed outside the measurement tube P so as to face each other and has the function of generating a magnetic field in the direction orthogonal to the direction in which the fluid flows through the flow path according to an alternating current magnetic excitation current IL supplied from the converter 10B.

The electrodes TA and TB are formed by a pair of electrodes disposed (in contact with the fluid flowing through the flow path) on the inner wall of the measurement tube P so as to face the direction orthogonal to the direction of the magnetic field generated by the magnetic excitation coil L and have the function of detecting an electromotive force e generated in the fluid flowing through the magnetic field and outputting the electromotive force e to the converter 10B. The electropotential of the measurement tube P is connected to the ground electropotential of the converter 10B via a ground terminal TG.

The converter 10B is provided with a magnetic excitation circuit 11, an alternating current amplifying circuit 12, a sample hold circuit 13, an A/D converting device 14, a communication circuit 15, and a controlling circuit 16 as main circuits.

The magnetic excitation circuit 11 has the function of supplying the alternating current magnetic excitation current IL having a predetermined magnetic excitation frequency and electric current value to the detector 10A according to a magnetic excitation control signal CT from the controlling circuit 16.

The alternating current amplifying circuit 12 has the function of performing the alternating current amplification of the electromotive force e input from the detector 10A via a capacitive element C and outputting the amplified electromotive force as an alternating current flow rate signal E.

The sample hold circuit 13 has the function of sampling and holding the voltage with a stable waveform in a particular period among the positive side waveform and the negative side waveform of the alternating current flow rate signal E output from the alternating current amplifying circuit 12 and outputting the voltage as a direct current flow rate voltage V.

The A/D converting device 14 has the function of performing the A/D conversion of the direct current flow rate voltage V output from the sample hold circuit 13 and outputting the obtained flow rate voltage data D to the controlling circuit 16.

The communication circuit 15 has the function of reporting information such as a measured flow rate value F and alarm by communicating with a higher-level device via a communication line W.

The controlling circuit 16 includes a CPU and its peripheral circuits as a whole and has the function of reading programs from a memory (not illustrated) to achieve various types of processing portions and performing corresponding processing.

The main processing performed by the controlling circuit 16 includes measured flow rate value calculation processing, communication control processing, flow evaluating processing, and magnetic excitation control processing. Of these types of processing, flow evaluating processing is performed by a flow evaluating portion 16A and magnetic excitation control processing is performed by a magnetic excitation controlling portion 16B.

Measured flow rate value calculation processing calculates the measured flow rate value F based on the voltage value of the flow rate voltage data D output from the A/D converting device 14.

Communication control processing reports the measured flow rate value F calculated by measured flow rate value calculation processing from the communication circuit 15 to a higher-level device via the communication line W.

The flow evaluating portion 16A has the function of comparing the measured flow rate value F calculated by measured flow rate value calculation processing with a preset reference flow rate value FS and determining whether the fluid is flowing through the measurement tube P.

The magnetic excitation controlling portion 16B has the function of driving the magnetic excitation circuit 11 by outputting the magnetic excitation control signal CT indicating the magnetic excitation frequency and electric current value of the magnetic excitation current IL supplied to the magnetic excitation coil L and the function of imposing a limitation so that the magnetic excitation current IL reduces to an electric current value (limited electric current value Ir) less than the magnetic excitation current (normal electric current value Ig) obtained during normal measurement when the flow evaluating portion 16A determines that the fluid is not flowing through the measurement tube P and releasing the limitation on the magnetic excitation current IL when the flow evaluating portion 16A determines that the fluid is flowing.

More specifically, the magnetic excitation controlling portion 16B instructs the magnetic excitation circuit 11 to switch the magnetic excitation current to the limited electric current value Ir less than the normal electric current value Ig used for normal flow rate measurement using the magnetic excitation control signal CT when imposing a limitation on the magnetic excitation current IL and instructs the magnetic excitation circuit 11 to switch the magnetic excitation current to the normal electric current value Ig using the magnetic excitation control signal CT when releasing the limitation on the magnetic excitation current IL.

The magnetic excitation controlling portion 16B may specifically instruct the normal electric current value Ig and the limited electric current value Ir using the magnetic excitation control signal CT. However, the magnetic excitation controlling portion 16B may instruct only the imposing and releasing of the limitation on the magnetic excitation current IL to the magnetic excitation circuit 11 using the magnetic excitation control signal CT and the magnetic excitation circuit 11 may perform switching between the limited electric current value Ir and the normal electric current value Ig according to the instruction.

Generally, the electric current value of the magnetic excitation current IL is proportional to the electromotive force e generated between the electrodes TA and TB of the detector 10A and the electromotive force e becomes larger as the electric current value of the magnetic excitation current IL increases. Accordingly, anti-noise performance is improved and a high measurement precision can be obtained. Accordingly, during normal measurement that does not limit electric current, the normal electric current value Ig providing a certain level of measurement precision is used.

In contrast, in the period in which the electric current value of the magnetic excitation current IL is limited, it is necessary to continue a determination as to whether the fluid is flowing through the measurement tube P and release the limitation when the fluid is flowing again, but a high measurement precision does not need to be maintained. Accordingly, the value (that is, the limited electric current value Ir) of the magnetic excitation current IL during limitation of electric current may be the minimum electric current value necessary for flow rate measurement. At this time, the limited electric current value Ir less than the normal electric current value Ig may be preset and switching to the limited electric current value Ir may be performed when it is determined that the fluid is not flowing. Alternatively, the normal electric current value Ig may be limited (reduced) based on a reduction ratio preset as the limited electric current value Ir.

Operation of the First Embodiment

Figure 2:
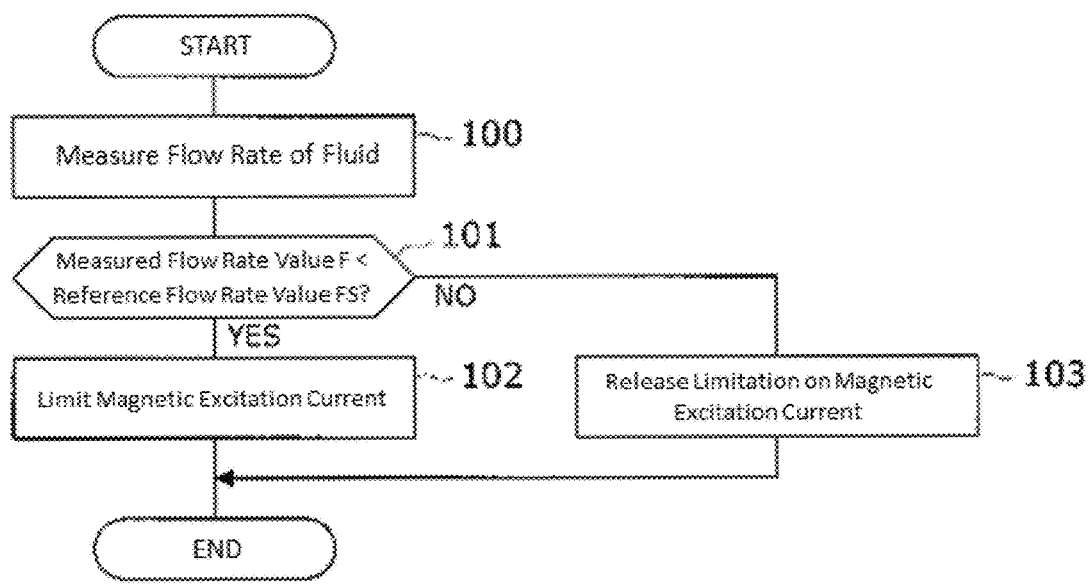
FIG. 2 is a flowchart illustrating magnetic excitation current suppression processing according to the first embodiment.

Next, the operation of an electromagnetic flow meter according to the embodiment will be described with reference to FIG. 2. FIG. 2 is a flowchart illustrating magnetic excitation current suppression processing according to the first embodiment.

The electromagnetic flow meter 10 periodically performs the magnetic excitation current suppression processing illustrated in FIG. 2 during flow rate measurement.

First, the controlling circuit 16 calculates the measured flow rate value F based on the voltage value of the flow rate voltage data D output from the A/D converting device 14 using measured flow rate value calculation processing (step 100) and the flow evaluating portion 16A compares the measured flow rate value F calculated by measured flow rate value calculation processing in the controlling circuit 16 with the preset reference flow rate value FS and determines whether the fluid is flowing through the measurement tube P (step 101).

When it is determined that the fluid is not flowing since the measured flow rate value F is less than the reference flow rate value FS (YES in step 101), the magnetic excitation controlling portion 16B imposes a limitation so that the magnetic excitation current IL reduces to the limited electric current value Ir less than the normal electric current value Ig using the magnetic excitation control signal CT (step 102) and completes a series of magnetic excitation current suppression processing.

In contrast, when it is determined that the fluid is flowing since the measured flow rate value F is equal to or more than the reference flow rate value FS (NO in step 101), the magnetic excitation controlling portion 16B releases the limitation on the magnetic excitation current IL using the magnetic excitation control signal CT (step 103) and completes a series of magnetic excitation current suppression processing.

Figure 3:
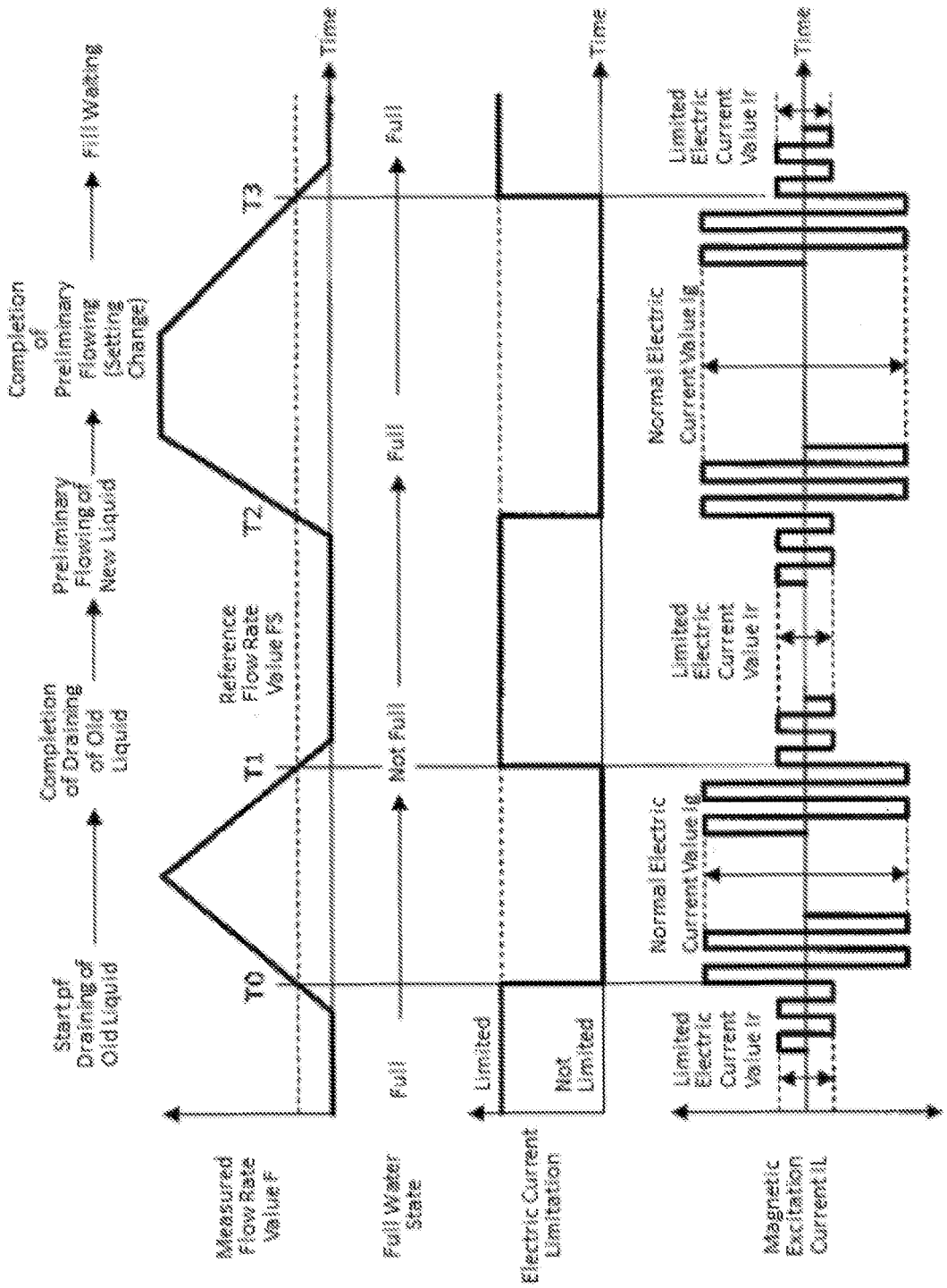
FIG. 3 is a signal waveform diagram illustrating magnetic excitation current suppression operation according to the first embodiment.

FIG. 3 is a signal waveform diagram illustrating magnetic excitation current suppression operation according to the first embodiment and this diagram indicates the measured flow rate value F, electric current limitation presence/absence determination, and time-series changes in the magnetic excitation current IL in a liquid exchange process.

First, in the period until the old fluid starts being drained, the old fluid previously filling the container stays in the measurement tube P. Accordingly, the measured flow rate value F is 0 and smaller than the reference flow rate value FS, so it is determined that the fluid is not flowing and an electric current limitation is imposed. This imposes a limitation so that the magnetic excitation current IL reduces to the limited electric current value Ir. Therefore, even when the old fluid stays and bubbles are likely to be generated, generation of bubbles from the fluid can be suppressed since the amount of heat generated by the magnetic excitation coil L is reduced.

When the old fluid starts being drained, the measured flow rate value F increases gradually and, at time mark T0 at which the measured flow rate value F reaches the reference flow rate value FS, it is determined that the fluid is flowing and the electric current limitation is released. This returns the magnetic excitation current IL to the normal electric current value Ig.

After that, drainage takes place and the measured flow rate value F of the old fluid reduces gradually. At time mark T1 at which the measured flow rate value F becomes less than the reference flow rate value FS, it is determined that the fluid is not flowing and an electric current limitation is imposed. This imposes a limitation so that the magnetic excitation current IL reduces to the limited electric current value Ir again. In this case, since the old liquid nor the new liquid stays in the measurement tube P, no bubbles are generated in the fluid.

When the old fluid has been drained and the new fluid starts being preliminarily flowed, the measured flow rate value F increases gradually and, at time mark T2 at which the measured flow rate value F reaches the reference flow rate value FS, it is determined that the fluid is flowing and the electric current limitation is released. This returns the magnetic excitation current IL to the normal electric current value Ig.

After that, preliminary flowing takes place and the measured flow rate value F of the new fluid reduces gradually and, at time mark T3 at which the measured flow rate value F becomes smaller than the reference flow rate value FS, it is determined that the fluid is not flowing and an electric current limitation is imposed. This imposes a limitation so that the magnetic excitation current IL reduces to the limited electric current value Ir again. Therefore, even when the new fluid stays and bubbles are likely to be generated, generation of bubbles from the fluid can be suppressed since the amount of heat generated by the magnetic excitation coil L is reduced.

Effects of the First Embodiment

As described above, in the embodiment, the flow evaluating portion 16A compares the measured flow rate value F with the preset reference flow rate value FS and determines whether the fluid is flowing through the measurement tube P. When the flow evaluating portion 16A determines that the fluid is not flowing through the measurement tube P, the magnetic excitation controlling portion 16B imposes a limitation so that the magnetic excitation current IL reduces to an electric current value less than the magnetic excitation current IL obtained in normal measurement. When the flow evaluating portion 16A determines that the fluid is flowing through the measurement tube P, the magnetic excitation controlling portion 16B releases the limitation on the magnetic excitation current IL.

Accordingly, since the magnetic excitation current IL is limited when the fluid is not flowing through the measurement tube P, the amount of heat generated by the magnetic excitation coil L is reduced and the generation of bubbles from the fluid is suppressed even when the fluid stays and bubbles are likely to be generated.

Accordingly, in the filling of a gas-dissolved fluid such as a fluid (aerated water) including carbon dioxide or a fluid (oxygen water) including oxygen using a fluid filling machine that fills a container such as a plastic bottle with a fluid such as drink, even when the fluid stays in the measurement tube P during preparation work such as a liquid exchange process or adjustment process, it is possible to prevent bubbles of gas generated in the fluid from interfering with flow rate measurement.

Second Embodiment

Figure 4:
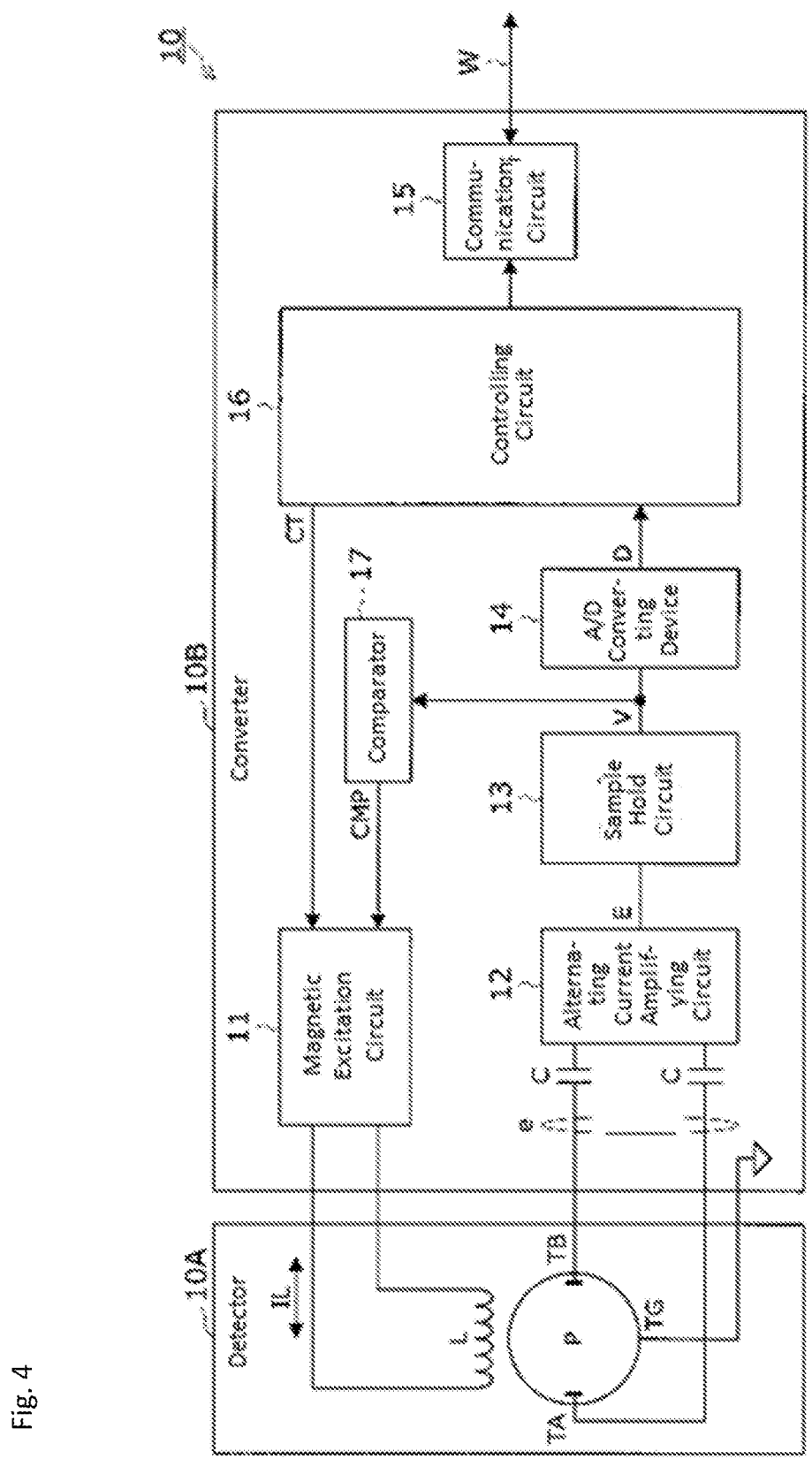
FIG. 4 is a block diagram illustrating the structure of an electromagnetic flow meter according to a second embodiment.

Next, the electromagnetic flow meter 10 according to the second embodiment of the invention will be described with reference to FIG. 4. FIG. 4 is a block diagram illustrating the structure of an electromagnetic flow meter according to the second embodiment.

The first embodiment has provided an example of controlling a limitation on the magnetic excitation current IL using the flow evaluating portion 16A and the magnetic excitation controlling portion 16B provided in the controlling circuit (CPU) 16. This embodiment provides the case in which a limitation on the magnetic excitation current IL is controlled by a comparator 17 and the magnetic excitation circuit 11 instead of the controlling circuit 16.

In the embodiment, the comparator 17 has the function of comparing the direct current flow rate voltage V obtained by the sample hold circuit 13 with a preset reference flow rate voltage VS and determining whether the fluid is flowing through the measurement tube P and the comparator 17 is a circuit achieving the flow evaluating portion 16A.

When the comparator 17 determines that the fluid is not flowing since the direct current flow rate voltage V is less than the reference flow rate voltage VS, the magnetic excitation circuit 11 imposes a limitation so that the magnetic excitation current IL reduces to an electric current value less than the magnetic excitation current IL obtained during normal measurement. When the comparator 17 determines that the fluid is flowing since the direct current flow rate voltage V is equal to or more than the reference flow rate voltage VS, the magnetic excitation circuit 11 releases the limitation on the magnetic excitation current IL.

More specifically, when imposing a limitation on the magnetic excitation current IL, the magnetic excitation circuit 11 switches the magnetic excitation current IL to the limited electric current value Ir less than the normal electric current value Ig used for normal flow rate measurement and, when releasing the limitation on the magnetic excitation current IL, the magnetic excitation circuit 11 switches the magnetic excitation current IL to the normal electric current value Ig.

Operation of the Second Embodiment

Figure 5:
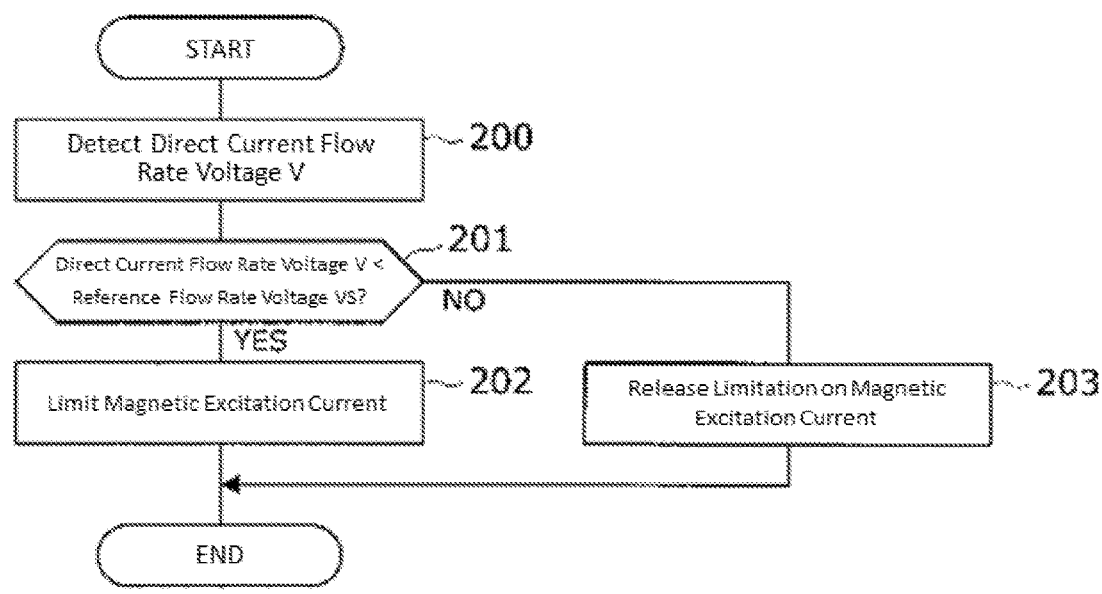
FIG. 5 is a flowchart illustrating magnetic excitation current suppression processing according to the second embodiment.

Next, the operation of the electromagnetic flow meter according to the embodiment will be described with reference to FIG. 5. FIG. 5 is a flowchart illustrating magnetic excitation current suppression processing according to the second embodiment.

The electromagnetic flow meter 10 periodically performs the magnetic excitation current suppression processing illustrated in FIG. 5 during flow rate measurement.

First, the comparator 17 captures the direct current flow rate voltage V output from the sample hold circuit 13 (step 200), compares the direct current flow rate voltage V with the preset reference flow rate voltage VS, determines whether the fluid is flowing through the measurement tube P, and outputs an evaluation result signal CMP (step 201).

When the evaluation result signal CMP from the comparator 17 indicates that the fluid is not flowing since the direct current flow rate voltage V is less than the reference flow rate voltage VS (YES in step 201), the magnetic excitation circuit 11 imposes a limitation so that the magnetic excitation current IL reduces to the limited electric current value Ir less than the normal electric current value Ig (step 202) and completes a series of magnetic excitation current suppression processing.

In contrast, when the evaluation result signal CMP from the comparator 17 is indicated that the fluid is flowing since the direct current flow rate voltage V is equal to or more than the reference flow rate voltage VS (NO in step 201), the magnetic excitation controlling portion 16B releases the limitation on the magnetic excitation current IL using the magnetic excitation control signal CT (step 203) and completes a series of magnetic excitation current suppression processing.

Figure 6:
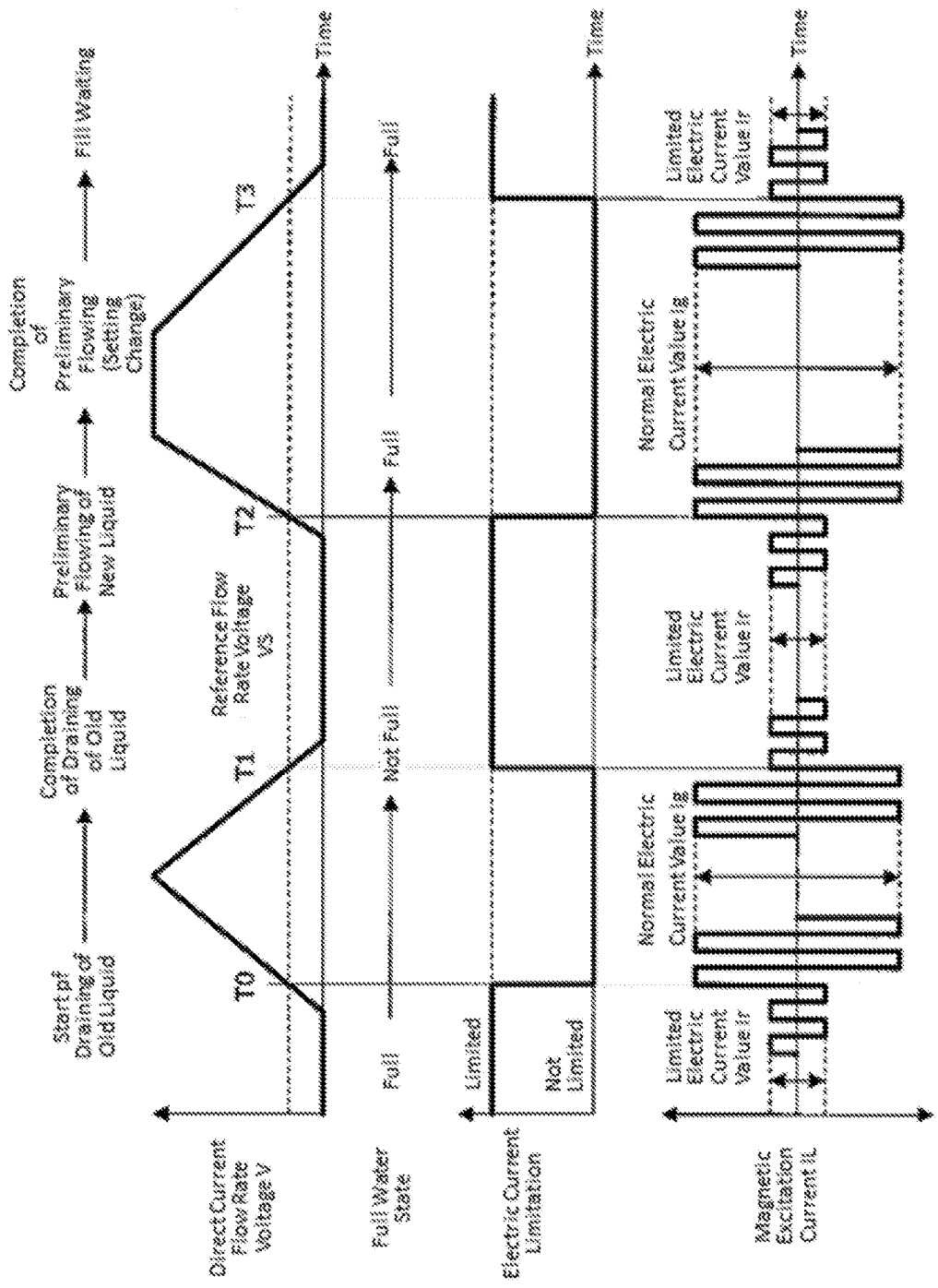
FIG. 6 is a signal waveform diagram illustrating magnetic excitation current suppression operation according to the second embodiment.
Figure 7:
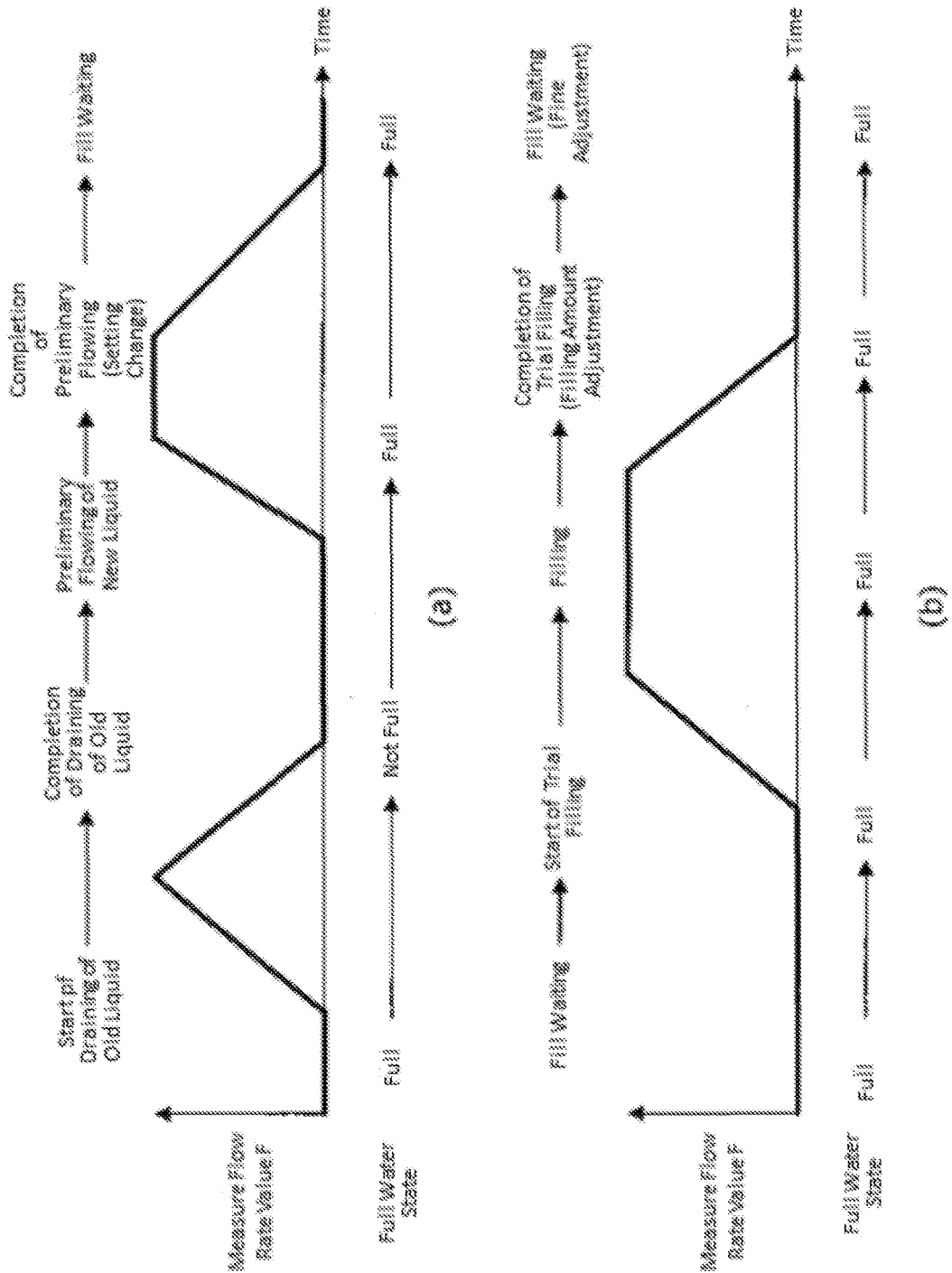
FIG. 7 is an explanatory diagram illustrating changes in the state of the electromagnetic flow meter in preparation work.

FIG. 6 is a signal waveform diagram illustrating magnetic excitation current suppression operation according to the second embodiment and this diagram indicates the direct current flow rate voltage V, electric current limitation presence/absence determination, and time-series changes in the magnetic excitation current IL in a liquid exchange process.

First, in the period until the old fluid starts being drained, the old fluid previously filling the container stays in the measurement tube P. Accordingly, the direct current flow rate voltage V is 0 and smaller than the reference flow rate voltage VS, so it is determined that the fluid is not flowing and an electric current limitation is imposed. This imposes a limitation so that the magnetic excitation current IL reduces to the limited electric current value Ir. Therefore, even when the old fluid stays and bubbles are likely to be generated, generation of bubbles from the fluid can be suppressed since the amount of heat generated by the magnetic excitation coil L is reduced.

When the old fluid starts being drained, the direct current flow rate voltage V increases gradually and, at time mark T0 at which the direct current flow rate voltage V reaches the reference flow rate voltage VS, it is determined that the fluid is flowing and an electric current limitation is released. This returns the magnetic excitation current IL to the normal electric current value Ig.

After that, drainage takes place and the direct current flow rate voltage V of the old fluid reduces gradually and, at time mark T1 at which the direct current flow rate voltage V becomes smaller than the reference flow rate voltage VS, it is determined that the fluid is not flowing and an electric current limitation is imposed. This imposes a limitation so that the magnetic excitation current IL reduces to the limited electric current value Ir again. In this case, since the old liquid nor the new liquid stays in the measurement tube P, no bubbles are generated in the fluid.

When the old fluid has been drained and the new fluid starts being preliminarily flowed, the direct current flow rate voltage V increases gradually and, at time mark T2 at which the direct current flow rate voltage V reaches the reference flow rate voltage VS, it is determined that the fluid is flowing and the electric current limitation is released. This returns the magnetic excitation current IL to the normal electric current value Ig.

After that, preliminary flowing takes place and the direct current flow rate voltage V of the new fluid reduces gradually and, at time mark T3 at which the direct current flow rate voltage V becomes smaller than the reference flow rate voltage VS, it is determined that the fluid is not flowing and an electric current limitation is imposed. This imposes a limitation so that the magnetic excitation current IL reduces to the limited electric current value Ir again. Therefore, even when the new fluid stays and bubbles are likely to be generated, generation of bubbles from the fluid can be suppressed since the amount of heat generated by the magnetic excitation coil L is reduced.

Effects of the Second Embodiment

As described above, in the embodiment, the comparator 17 compares a direct current flow rate voltage V obtained by the sample hold circuit 13 with the preset reference flow rate voltage VS and determines whether the fluid is flowing through the measurement tube P. When the comparator 17 determines that the fluid is not flowing since the direct current flow rate voltage V is less than the reference flow rate voltage VS, the magnetic excitation circuit 11 imposes a limitation so that the magnetic excitation current IL reduces to an electric current value less than the magnetic excitation current IL obtained during normal measurement. When the comparator 17 determines that the fluid is flowing since the direct current flow rate voltage V is equal to or more than the reference flow rate voltage VS, the magnetic excitation circuit 11 releases the limitation on the magnetic excitation current IL.

Accordingly, since the magnetic excitation current IL is limited when the fluid is not flowing through the measurement tube P, the amount of heat generated by the magnetic excitation coil L is reduced and the generation of bubbles from the fluid is suppressed even when the fluid stays and bubbles are likely to be generated.

Accordingly, in the filling of a gas-dissolved fluid such as a fluid (aerated water) including carbon dioxide or a fluid (oxygen water) including oxygen using a fluid filling machine that fills a container such as a plastic bottle with a fluid such as drink, even when the fluid stays in the measurement tube P during preparation work such as a liquid exchange process or adjustment process, it is possible to prevent bubbles of gas generated in the fluid from interfering with flow rate measurement.

Extension of the Embodiments

Although the invention has been described above with reference to the embodiments, the invention is not limited to the above embodiments. Various changes found by those skilled in the art can be made to the structure and details of the invention within the scope of the invention. In addition, embodiments can be practiced in any combination without occurrence of a contradiction.

DESCRIPTION OF REFERENCE NUMERALS AND SIGNS

10: electromagnetic flow meter, 10A: detector, 10B: converter, 11: magnetic excitation circuit, 12: alternating current amplifying circuit, 13: sample hold circuit, 14: A/D converting device, 15: communication circuit, 16: controlling circuit, 16A: flow evaluating portion, 16B: magnetic excitation controlling portion, 17: comparator, P: measurement tube, L: magnetic excitation coil, TA, TB: electrode, TG: ground terminal, IL: magnetic excitation current, Ig: normal electric current value, Ir: limited electric current value, e: electromotive force, C: capacitive element, E: alternating current flow rate signal, V: direct current flow rate voltage, D: flow rate voltage data, F: measured flow rate value, FS: reference flow rate value, CT: magnetic excitation control signal, VS: reference flow rate voltage, CMP: evaluation result signal.

The invention claimed is:

1. An electromagnetic flow meter, comprising:
a magnetic excitation circuit configured to supply a predetermined magnetic excitation current to a magnetic excitation coil such that a magnetic field is applied to a fluid flowing through a measurement tube;
a pair of electrodes disposed facing each other on an inner wall of the measurement tube and configured to detect an electromotive force generated in the fluid by the magnetic field, wherein the electromagnetic flow meter is configured to calculate a measured flow rate value of the fluid based on the electromotive force;
a flow evaluating portion configured to compare the measured flow rate value with a present reference flow rate value to determine whether the fluid is flowing through the measurement tube; and
a magnetic excitation controlling portion configured to impose a limitation that reduces the predetermined magnetic excitation current to an electric current value less than the predetermined magnetic excitation current value when the flow evaluating portion determines that the fluid is not flowing, wherein the magnetic excitation controlling portion is configured to release the limitation on the predetermined magnetic excitation current when the flow evaluating portion determines that the fluid is flowing.

2. The electromagnetic flow meter according to claim 1, wherein
the magnetic excitation controlling portion is configured to instruct the magnetic excitation circuit to switch the magnetic excitation current to the electric current value less than the predetermined electric current value when imposing the limitation on the magnetic excitation current and the magnetic excitation controlling portion is configured to instruct the magnetic excitation circuit to switch the magnetic excitation current to the predetermined electric current value when releasing the limitation on the magnetic excitation current.

3. An electromagnetic flow meter, comprising:
a magnetic excitation circuit configured to supply a predetermined magnetic excitation current to a magnetic excitation coil such that a magnetic field is applied to a fluid flowing through a measurement tube;
a pair of electrodes disposed facing each other on an inner wall of the measurement tube and configured to detect an electromotive force generated in the fluid by the magnetic field, wherein the electromagnetic flow meter is configured to calculate a measured flow rate value of the fluid based on the electromotive force;
a comparator configured to perform alternate current amplification of the electromotive force, the comparator configured to compare a direct current flow rate voltage obtained by sampling and holding with a preset reference flow rate voltage, and determining whether the fluid is flowing through the measurement tube, wherein the magnetic excitation circuit is configured to impose a limitation to reduce the magnetic excitation current to an electric current value less than the predetermined magnetic excitation current when the comparator determines that the fluid is not flowing and the magnetic excitation circuit is configured to release the limitation on the magnetic excitation current when the comparator determines that the fluid is flowing.

4. The electromagnetic flow meter according to claim 3, wherein the magnetic excitation circuit is configured to switch the magnetic excitation current to the electric current value less than the predetermined electric current value when imposing the limitation on the magnetic excitation current and the magnetic excitation circuit is configured to switch the magnetic excitation current to the predetermined electric current value when releasing the limitation on the magnetic excitation current.

5. A magnetic excitation control method for an electromagnetic flow meter, comprising:

supplying a predetermined magnetic excitation current from a magnetic excitation circuit to a magnetic excitation coil so that a magnetic field is applied to a fluid flowing through a measurement tube;

detecting an electromotive force generated in the fluid according to the magnetic field using a pair of electrodes disposed so as to face each other on an inner wall of the measurement tube;

calculating a measured flow rate value of the fluid based on the electromotive force;

in a flow determination step, comparing the measured flow rate value with a present reference flow rate value and determining whether the fluid is flowing through the measurement tube; and in a magnetic excitation control step, imposing a limitation so that the magnetic excitation current reduces to an electric current value less than the predetermined magnetic excitation current when the flow determination step determines that the fluid is not flowing and releasing the limitation on the magnetic excitation current when the flow determination step determines that the fluid is flowing.

6. The magnetic excitation control method according to claim 5, wherein the flow determination step performs alternate current amplification of the electromotive force, compares a direct current flow rate voltage obtained by sampling and holding with a preset reference flow rate voltage, and determines whether the fluid is flowing through the measurement tube.

* * * * *